US008793570B2

(12) United States Patent
Hanechak

(10) Patent No.: US 8,793,570 B2
(45) Date of Patent: *Jul. 29, 2014

(54) AUTOMATED PRODUCT LAYOUT

(75) Inventor: Brian D. Hanechak, Waltham, MA (US)

(73) Assignee: VistaPrint Schweiz GmbH, Winterthur (CH)

( * ) Notice: Subject to any disclaimer, the term of this patent is extended or adjusted under 35 U.S.C. 154(b) by 1276 days.

This patent is subject to a terminal disclaimer.

(21) Appl. No.: 12/428,794

(22) Filed: Apr. 23, 2009

(65) Prior Publication Data

US 2009/0204891 A1    Aug. 13, 2009

Related U.S. Application Data

(60) Division of application No. 11/503,636, filed on Aug. 14, 2006, now Pat. No. 7,584,424, which is a continuation-in-part of application No. 11/207,647, filed on Aug. 19, 2005, now Pat. No. 7,676,744.

(51) Int. Cl.
G06F 17/00       (2006.01)

(52) U.S. Cl.
USPC ............ 715/242; 715/243; 715/252; 715/253

(58) Field of Classification Search
CPC ... G06F 17/211; G06F 17/212; G06F 17/217; G06F 3/048
See application file for complete search history.

(56) References Cited

U.S. PATENT DOCUMENTS

| | | | |
|---|---|---|---|
| 4,581,710 A | | 4/1986 | Hasselmeier |
| 4,773,009 A | | 9/1988 | Kucera et al. |
| 5,031,121 A | | 7/1991 | Iwai et al. |
| 5,263,132 A | * | 11/1993 | Parker et al. ................. 715/207 |
| 5,559,934 A | | 9/1996 | Ogura et al. |
| 5,561,421 A | | 10/1996 | Smith et al. |
| 5,588,072 A | | 12/1996 | Wang |
| 5,649,216 A | * | 7/1997 | Sieber ........................ 715/234 |
| 5,835,920 A | | 11/1998 | Horton |
| 5,845,303 A | * | 12/1998 | Templeman ................. 715/255 |
| 5,848,184 A | | 12/1998 | Taylor et al. |
| 5,848,186 A | | 12/1998 | Wang et al. |
| 5,873,106 A | | 2/1999 | Joseph |
| 5,937,084 A | | 8/1999 | Crabtree et al. |

(Continued)

FOREIGN PATENT DOCUMENTS

EP     0327781     8/1989

OTHER PUBLICATIONS

Microsoft Paint, Windows 2000, © Microsoft Corp, Nov. 30, 1999.*

(Continued)

Primary Examiner — Adam M Queler
(74) Attorney, Agent, or Firm — Jessica Costa

(57) ABSTRACT

Methods and computer programs for automatically creating a text layout in an electronic design for a product to be printed. A number of defined text elements are available for user text entries. The product layout is based a user-selected image, if any, and on the text elements having user-supplied text content. Text elements without text content are disregarded. Positioning of user text entries is determined based on the size of the text entries, defined text element spacing distances, and defined positioning rules. Creating a layout incorporating user-supplied text entries and/or image may include cropping or resizing of other design elements in the product design and wrapping of relatively long text entries onto multiple lines.

20 Claims, 16 Drawing Sheets

(56) References Cited

U.S. PATENT DOCUMENTS

| | | | |
|---|---|---|---|
| 6,081,816 A | 6/2000 | Agrawal | |
| 6,532,461 B2 | 3/2003 | Evans | |
| 6,826,727 B1* | 11/2004 | Mohr et al. | 715/235 |
| 6,918,085 B1 | 7/2005 | Laval et al. | |
| 6,948,119 B1 | 9/2005 | Farmer et al. | |
| 7,028,255 B1* | 4/2006 | Ayers | 715/202 |
| 7,237,193 B1* | 6/2007 | Zaky et al. | 715/207 |
| 7,263,659 B2 | 8/2007 | Hull et al. | |
| 7,356,760 B2 | 4/2008 | Jaeger | |
| 7,373,593 B2* | 5/2008 | Uchida | 715/210 |
| 7,409,635 B2* | 8/2008 | Epstein | 715/243 |
| 7,434,159 B1 | 10/2008 | Lin | |
| 7,475,333 B2 | 1/2009 | Otter et al. | |
| 7,584,424 B2 | 9/2009 | Hanechak | |
| 7,640,499 B2 | 12/2009 | Kato | |
| 7,783,969 B1 | 8/2010 | Menninga | |
| 7,801,358 B2 | 9/2010 | Furmaniak et al. | |
| 7,962,462 B1 | 6/2011 | Lamping et al. | |
| 8,020,093 B2 | 9/2011 | Yalovsky | |
| 8,127,227 B1 | 2/2012 | Kates et al. | |
| 2002/0116418 A1 | 8/2002 | Lachhwani et al. | |
| 2002/0178223 A1 | 11/2002 | Bushkin | |
| 2003/0084055 A1 | 5/2003 | Tanaka | |
| 2003/0125931 A1 | 7/2003 | Campbell | |
| 2003/0192011 A1 | 10/2003 | Williamson et al. | |
| 2004/0194036 A1 | 9/2004 | Wolska et al. | |
| 2004/0205602 A1* | 10/2004 | Croeni | 715/517 |
| 2004/0205642 A1 | 10/2004 | Menninga | |
| 2004/0225962 A1 | 11/2004 | Ohashi et al. | |
| 2004/0249664 A1 | 12/2004 | Broverman et al. | |
| 2005/0010859 A1 | 1/2005 | McDonough et al. | |
| 2005/0034068 A1 | 2/2005 | Jaeger | |
| 2005/0094207 A1 | 5/2005 | Lo et al. | |
| 2005/0216836 A1 | 9/2005 | Duke et al. | |
| 2005/0262437 A1 | 11/2005 | Patterson et al. | |
| 2006/0031761 A1 | 2/2006 | Ohta | |
| 2006/0112333 A1 | 5/2006 | Iwanaga | |
| 2006/0117255 A1 | 6/2006 | Seeler | |
| 2007/0079282 A1 | 4/2007 | Nachani et al. | |
| 2007/0150358 A1 | 6/2007 | Allen et al. | |
| 2007/0266309 A1 | 11/2007 | Sellman | |
| 2007/0286484 A1* | 12/2007 | Xie et al. | 382/173 |
| 2008/0295019 A1 | 11/2008 | Han et al. | |
| 2009/0307583 A1 | 12/2009 | Tonisson | |
| 2010/0153889 A1 | 6/2010 | Krause | |
| 2011/0145701 A1 | 6/2011 | Dejean et al. | |

OTHER PUBLICATIONS

Microsoft Paint Screenshots Figure 6 Created by examiner with Microsoft Paint 5.0.2150.1.*

Krieger, Stephanie: "12 Tips for Creating Better Presentations"[Online], Jan. 7, 2005, XP002448464 <http://www.microsoft.com/AtWork/getworkdone/presentations.mspx>.

Liang et al, Performance Evaluation of Document Layout Analysis Algorithms on the UW data set, Google 1997, pp. 1-12.

Lienhart et al., Localizing and Segmenting Text in Images and Videos, IEEE 2002, pp. 256-268.

Power et al., Document Structrure, Google 2003, pp. 1-50.

Sebrechts et al., Visualization of Search Results: A comparative Evaluation of Text, 2D, and 3D Interface, ACM 1999, pp. 3-10.

Xiao et al., Text Region Extraction in a Document Image Based on the Delaunay Tessellation, Google 2003, pp. 799-809.

Furuta et al., "Interactively Editing Structured Documents," Electronic Publishing, pp. 19-44 (Apr. 1988).

Ali et al., "Adaptive Layout for Interactive Documents," Springerlink, pp. 247-254 (2008).

Yamamoto et al., "Interaction Design Tools for Fostering Creativity in the Early Stages of Information Design," ScienceDirect 2005, pp. 513-535.

Chao et al., "Layout and Content Extraction for PDF Documents," Springer 2004, pp. 213-224.

Ryu et al., "Parameter-independent Geometric Document Layout Analysis," IEEE 2000, pp. 397-400.

Hurst et al., "Layout and Language: Integrating Spatial and Linguistic Knowledge for Layout Understanding Tasks," ACM 2000, pp. 334-340.

* cited by examiner

AUTOMATED PRODUCT LAYOUT

This application is a divisional of prior application Ser. No. 11/503,636 filed on Aug. 14, 2006, which is a continuation-in-part of prior application Ser. No. 11/207,647 filed on Aug. 19, 2005, each of which is hereby incorporated by reference in its entirety.

FIELD OF THE INVENTION

This invention relates to the online creation of customized product designs.

BACKGROUND OF THE INVENTION

Printing services Web sites that allow a user to access the site from the user's home or work and design a personalized document are well known and widely used by many consumers, professionals, and businesses. Typically, these types of sites allow the user to review thumbnail images of a number of customizable designs prepared by the site operator with a variety of different styles, formats, backgrounds, color schemes, fonts and designs from which the user may choose. When the user has selected a specific template design to customize, the sites typically provide online tools allowing the user to incorporate the user's personal information into the selected template to create a custom document design. When the design is completed to the user's satisfaction, the user can place an order through the site for production and delivery of a desired quantity of the corresponding printed product.

One very common printed product that is often ordered through printing services sites is the business card. The type of information that is normally provided on a typical business card is well known and can be fairly reliably predicted. To facilitate the easy and rapid preparation of a business card, printing services sites often provide a simple text entry tool that can be easily used by customers with little or no online product design experience.

Referring to FIG. 1, a representative online business card creation screen displayed to a user at the user's computer system is depicted. In this example, text entry fields 101-111 into which the user can type the desired information are provided. To assist the user, each text entry field 101-111 has an associated text label indicating the specific information the services provider recommends that the user enter into that field. For example, field 101 is indicated as the field for entering the user's company name, field 102 is the field for the user's company message, and so forth. The fields are normally empty when initially displayed to the user.

Template image 120 is the particular business card design template selected by the user for customization. In the example shown in FIG. 1, template image 120 contains an image area 121 and a text entry area 122. Template 120 is merely representative and other template designs could have one or more images of different sizes and/or positions or no images at all.

The service provider will typically have specified a default font, font size, and other font characteristics in which each user text entry will be displayed. To illustrate to the user the location and appearance of the user's information as it will appear in the design, generic text entries such as "Company Name", "Full Name" and so forth are initially displayed in template 120. Preview button 130 is provided to allow the user to cause template 120 to be updated to replace the default generic text information in text area 122 with the information entered by the user in fields 101-111. Display 100 may also include various other items, not shown, such as informational, navigational, and promotional banners, messages and links.

Because the user is interacting with the service provider's site using a Web browser program running on the user's computer system, the document creation tools and displays are provided by the server to the user's computer in a markup language such as XHTML (eXtensible Hypertext Markup Language) suitable for execution by the browser program. What the user sees on the user's display as the design of a business card is the result of the browser's rendering of a collection of discrete markup language elements.

Each text entry field 101-111 is associated with an individual textbox. The individual textbox elements of template 120 are depicted for illustration in FIG. 2. Text entry fields 101-111 correspond to textboxes 201-211. As is well understood by those of skill in the art, each textbox element will have a number of associated parameters. Some parameters relate to the displaying of the text in the textbox, such as the font to be used, font size, font color, and font attributes such as bolding or italics. Other parameters relate to the textbox itself, such as the width of the textbox, the absolute or relative position of the textbox, and whether or not text wrapping is enabled.

In a typical prior art application of this type of design system, each textbox element is assigned a fixed absolute position within the overall template 120 design. For example, the horizontal and vertical pixel offset of the upper left corner of each textbox, such as corner 220 of text box 201, relative to the upper left corner 221 of the template 120 image is defined for each textbox 201-211. While this type of inflexible design may result in an acceptable finished product in many cases, in some situations the product design will be aesthetically unpleasing or possibly so defective as to be completely unusable.

While template 120 has been designed to yield a pleasing card containing eleven common business card data entries, some users have no use or desire for eleven different entries. The user is not forced to make an entry in each field and may choose to leave one or more fields empty. If a user makes entries in only a few of the fields, spacing between entries in the product design may be uneven and unattractive. For example, if a user entered only a company name in text field 101, a name in text field 103, and a Web address in field 111, the resulting three lines of information displayed in textboxes 201, 203 and 211 would be widely separated over almost the entire height of the card.

Another drawback in the prior art is that the template 120 layout design anticipates that all entries by a user will fit on one line. A problem is created if the user enters more text than the textbox can accommodate on a single line. If text wrapping for a textbox is not enabled, the user's desired text will exceed the line capacity and will be truncated. If text wrapping is enabled, when the user's text exceeds the capacity of a single line, the text will be wrapped onto a second line, often resulting in the text content of one textbox overlapping the text content of another textbox, creating an unusable design. Both of these situations are clearly undesirable.

There is, therefore, a need for a flexible design layout method that automatically adjusts the design according to the text entries made by the user.

SUMMARY

The present invention is directed at satisfying the need for automated generation of aesthetically pleasing text layouts in a markup language design.

In accordance with one aspect of the invention, a plurality of text elements are defined for receiving user text for incorporation into a markup language design. In creating a text layout, text elements having no text content are disregarded. Positions of the text elements having text content are determined based on the heights of the text elements, defined spacing distances between adjacent text elements, and the defined text element positioning order.

It is an advantage of the invention that attractive text layouts can be automatically created for a wide variety of user text entry choices.

These and other objects, features and advantages of the invention will be better understood with reference to the accompanying drawings, description and claims.

DETAILED DESCRIPTION

For the purposes of illustration and discussion, the invention will be described in the context of the online design of a business card. It will be understood that the invention is not so limited and can be employed in any type of customization application where there is a requirement or desire to automatically create a layout within a defined area of a markup language design.

Figure 3:
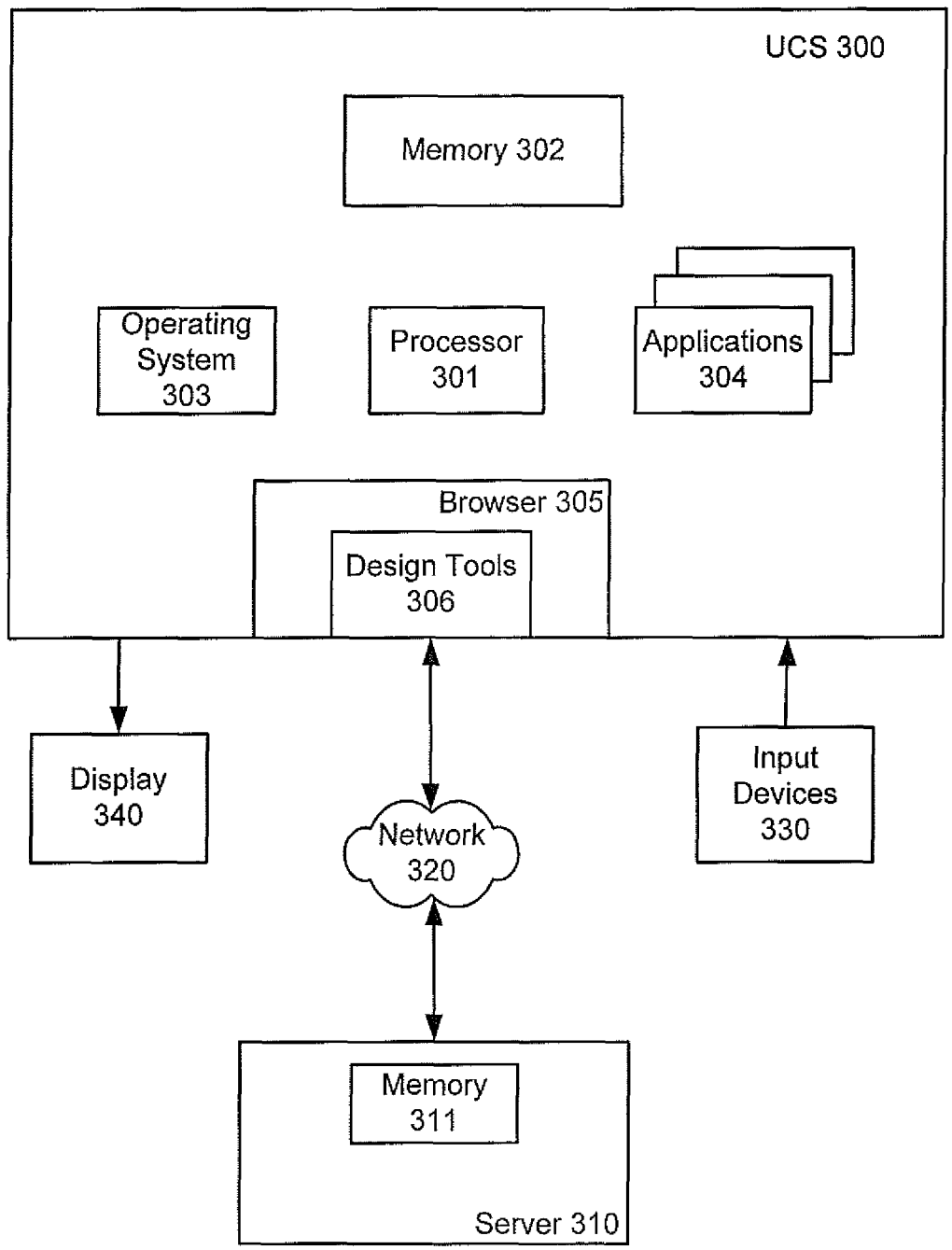
FIG. 3 shows a representative system with which the invention may be employed

FIG. 3 depicts a typical system with which the invention may be employed. User computer system UCS 300 includes processor 301 and one or more computer readable storage mediums 302. The one or more computer readable storage mediums 302 represents all UCS 300 components and subsystems that provide data storage, such as RAM, ROM, and hard drives. In addition to providing permanent storage for all programs installed on UCS 300, the computer readable storage mediums 302 also provides temporary storage required by the operating system and the applications while they are executing. In a preferred embodiment, UCS 300 is a typically equipped personal computer, but UCS 300 could also be a portable computer, a tablet computer, or other device. The user views images from UCS 300 on display 340, such as a CRT or LCD screen, and provides inputs to UCS 300 via input devices 330, such as a keyboard and a mouse.

When UCS 300 is operating, an instance of the USC 300 operating system, for example a version of the Microsoft Windows operating system, will be running, represented in FIG. 3 by operating system 303. In addition, the user may be running one or more application programs Applications 304. In FIG. 3, UCS 300 is running Web browser 305, such as Internet Explorer from Microsoft Corporation. In the depicted embodiment, design tools 306 is a product design program downloaded to UCS 300 via network 320 from remote server 310, such as downloadable design tools provided by VistaPrint Limited and publicly available at vistaprint.com. Design tools 306 runs in browser 305 and exchanges information and instructions with server 310 during a design session to support the user's preparation of a customized product design in electronic form. When the customer is satisfied with the design of the product, the design can be uploaded to server 310 for storage and, if desired by the user, subsequent production of the desired quantity of the physical product on appropriate printing and post-print processing systems.

While server 310 is shown in FIG. 3 as a single block, it will be understood that server 310 could be multiple servers configured to communicate and operate cooperatively to support Web site operations. Server 310 will typically be interacting with many user computer systems, such as UCS 300, simultaneously. One or more computer readable storage mediums 311 represents all components and subsystems that provide server data storage, such as RAM, ROM, and disk drives or arrays. The one or more computer readable storage mediums 311 stores the various layouts, designs, colors, fonts, and other information provided by the service provider to enable the creation and rendering of templates. As used in the embodiment described herein, a markup language product design, such as template 120, is an XML description that specifies the size, position and other attributes of all product elements such as text containers, image containers, graphics, z-index values and so forth.

Figure 4:
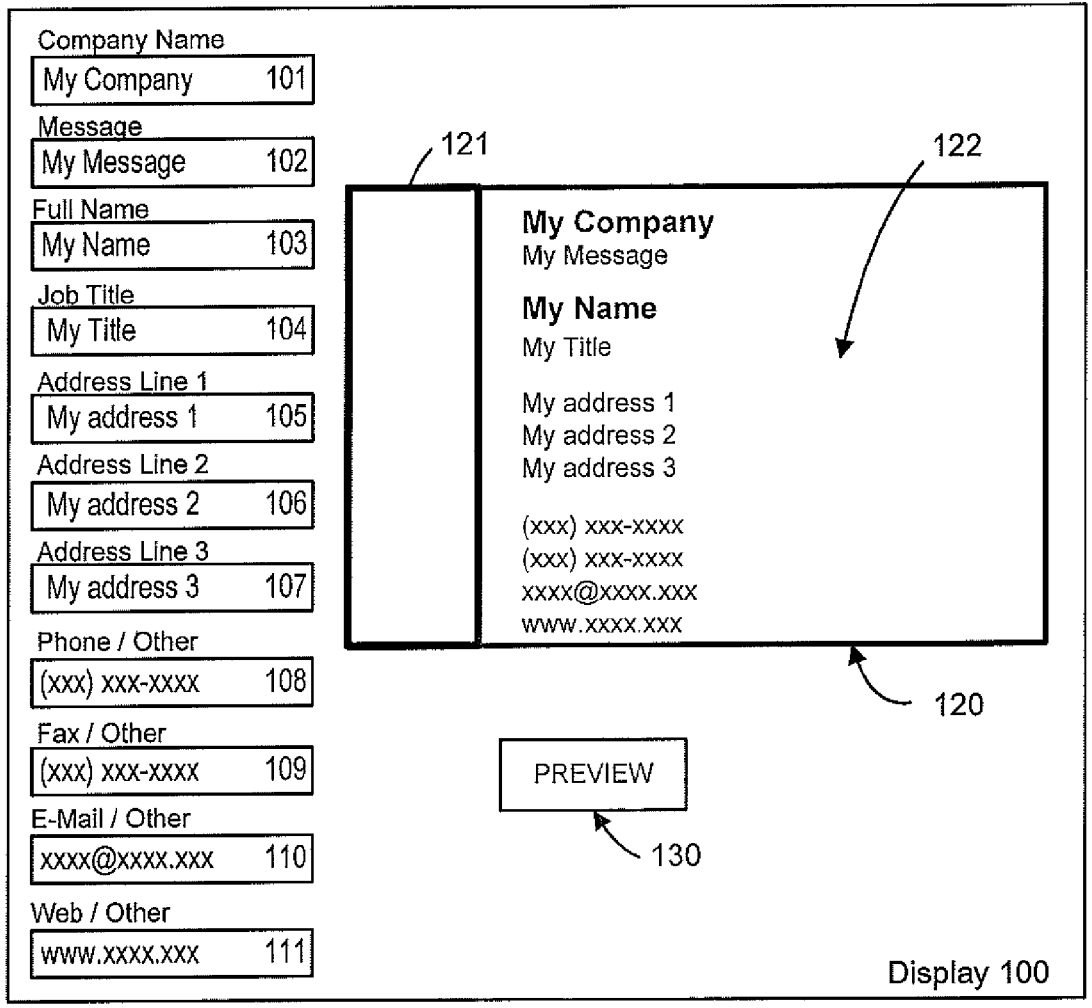
FIG. 4 shows a document customization screen.

Referring now to FIGS. 4-7D, representative examples of the application of the current invention will be discussed. For illustrative purposes, the text fields and templates are shown with generic information representing the type of data entries that might be made by users. The entries made by a user in the text fields will be generally referred to herein as "text", which will be understood to encompass all characters entered by the user including letters, numbers, punctuation marks, symbols, and the like. FIG. 4 depicts the status of display 100 after the entries shown have been made in text fields 101-111, Preview button 130 has been activated, and template 120 has been updated to reflect the information entered in text fields 101-111. It will be understood that the computer system where the updated template 120 image is generated is a design choice of the service provider. Generation of the updated template 120 image could be performed by browser program 305 using downloaded design tools 306 or design tools 306 could adapted to transfer the user's text entries to server 310 where the updated template 120 image description is prepared and returned to UCS 300 for displaying to the user.

Figure 1:
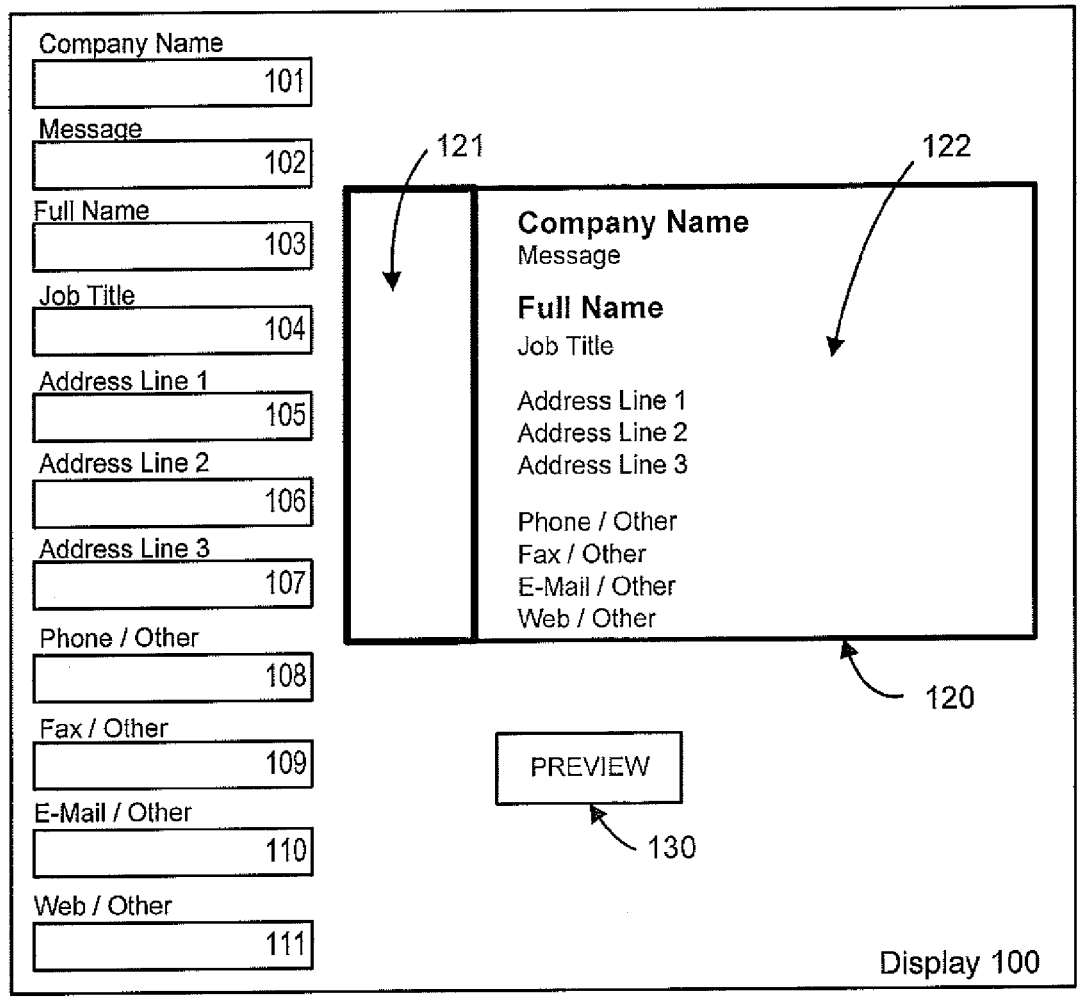
FIG. 1 shows an initial document customization screen.
Figure 2:
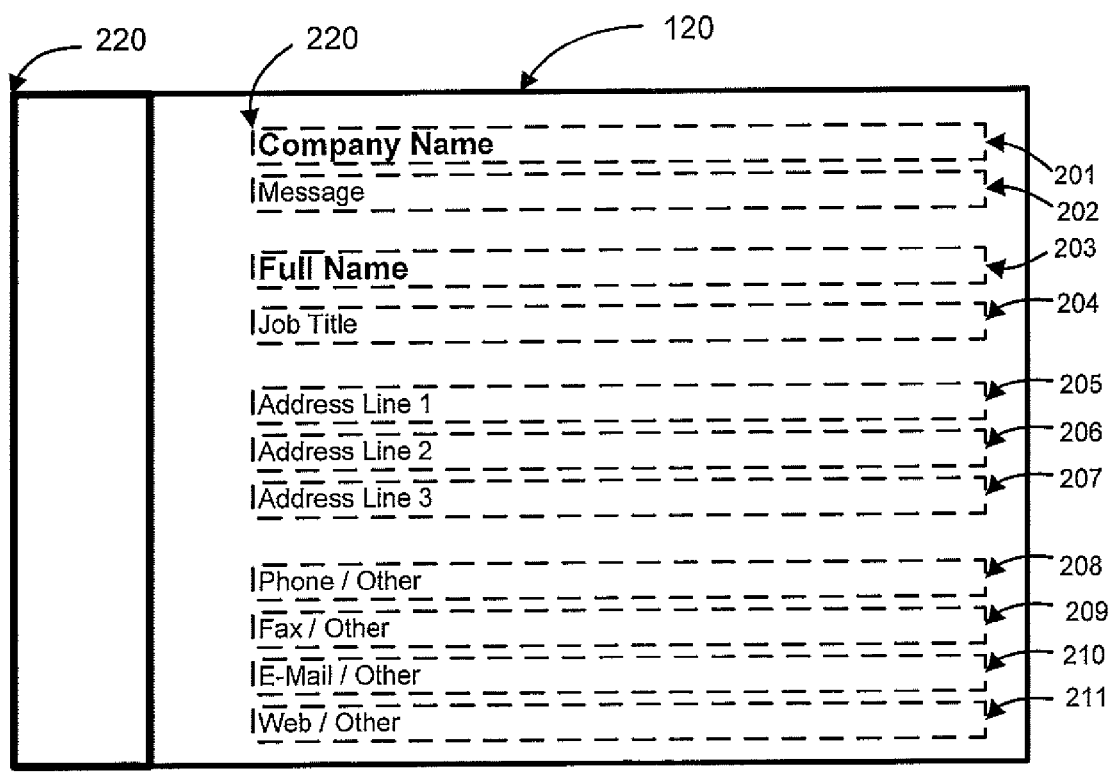
FIG. 2 shows the textbox elements of template 120.
Figure 5:
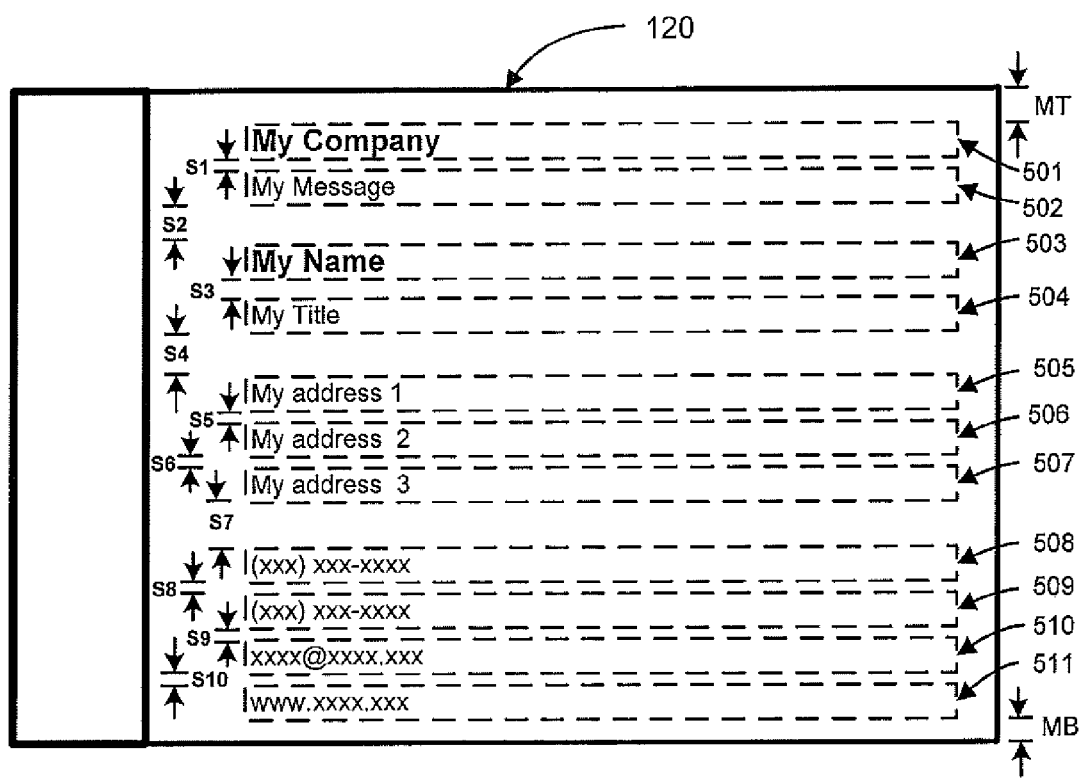
FIG. 5 shows the textbox elements and spacing of template 120 according to one embodiment of the invention.

Referring to FIG. 5, the textbox arrangement of template 120 according to an illustrative embodiment of the invention is depicted. Unlike the prior art technique described above in relation to FIG. 2, the positions of the textboxes displayed in template 120 are not fixed in advance, but are automatically and dynamically determined each time the user clicks Preview button 130 based on the user-entered information in text fields 501-511. Each textbox element 501-511 includes a parameter specifying its relative position in the textbox order. Spacing distances between adjacent displayed textboxes are also specified. A single standard spacing distance between adjacent text elements could be employed or multiple different distances could be used to provide greater layout flexibility. In the example depicted in FIGS. 4 and 5, the textboxes are organized into four groups. The spacing distance between adjacent groups is relatively larger than the spacing between adjacent textboxes within a group. That is, spacing distances S2, S4 and S7 are relatively larger than spacing distances S1, S3, S5, S6, S8, S9 and S10 such that four visually distinct groups are formed. As will be discussed in more detail below, this group spacing is maintained as long as even one textbox in a group contains text. To avoid placing text extremely close to the upper or lower edge of the design, textboxes cannot be located in defined minimum top (MT) and minimum bottom (MB) spaces.

Figure 6:
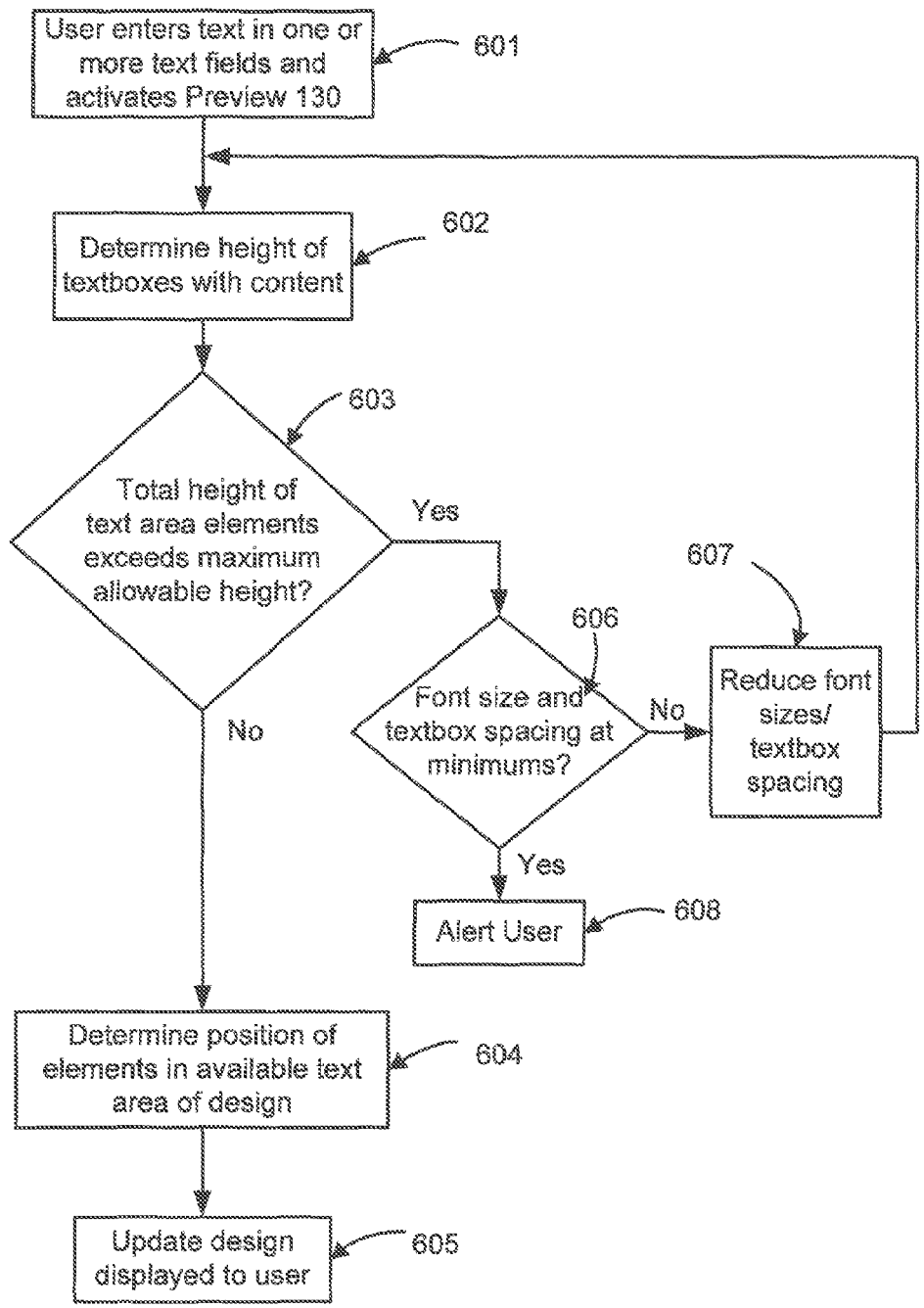
FIG. 6 shows a flow chart of one embodiment of the invention.

Referring now to FIG. 6, a representative process for automatically positioning elements will be discussed. At step 601, the user enters any desired text in any one or more of the available text entry fields 101-111. The user is not forced to make any entries and, therefore, one or more of the text fields may be empty when the user requests to view an updated template 120 by selecting Preview 130.

At step 602, the height in pixels of each textbox containing user-supplied text is determined. In the disclosed embodiment this textbox height value is requested from operating system 303 via a rich text edit control. Alternatively, the value could be obtained from browser program 305. At step 603, the heights of all elements to be displayed in the available text area are combined to determine their total height. In this example, the heights of all textboxes containing user text are added to the defined spacing between the textboxes and this value is compared with the maximum allowable height available for user text. For the purposes of this calculation, all empty textboxes, and the related textbox separation spacing distances, are ignored. In template 120, the maximum height available for user text placement is the height of the template minus the minimum top and bottom spaces MT and MB that must remain empty. If a template design includes an image or other design element across the top and/or bottom of the template, the available vertical text area would be correspondingly reduced.

If the calculated height of the textboxes having text content and related spacing distances does not exceed the maximum allowable height, at step 604 the positions of the textboxes in the available text area 122 are determined. The textboxes are arranged in the appropriate vertical sequence and positioned such that approximately one-half of the total calculated height is above the horizontal centerline of the text area and one-half is below the centerline. At step 605, display 100 is updated to display template 120 with the user's text.

Figure 7A:
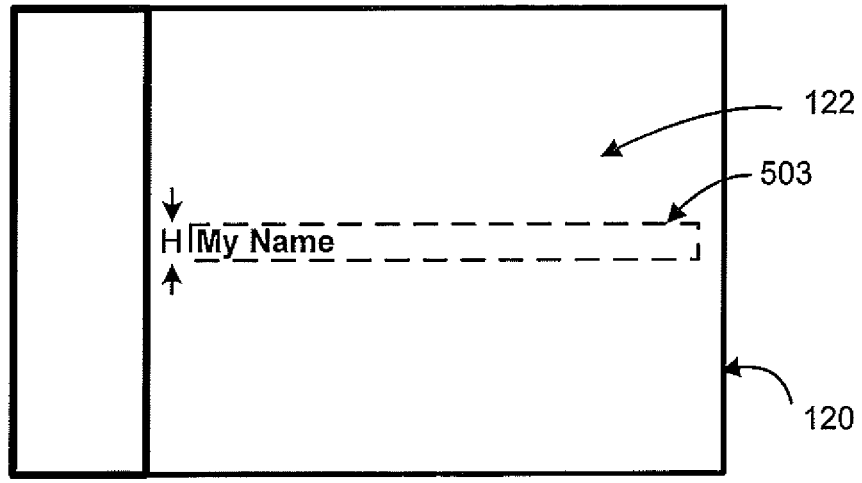
FIGS. 7A-7D depict illustrative product designs created according to one embodiment of the invention.

By way of illustration, FIG. 7A depicts the automatically generated layout result if the user were to enter "My Name" in text field 103, leaving all other text fields empty, and select Preview 130. In this situation, because only textbox 503 contains text, the total height H of the elements to be displayed in text area 122 is the height of textbox 503 and textbox 503 is substantially centered vertically in available text area 122.

Figure 7B:
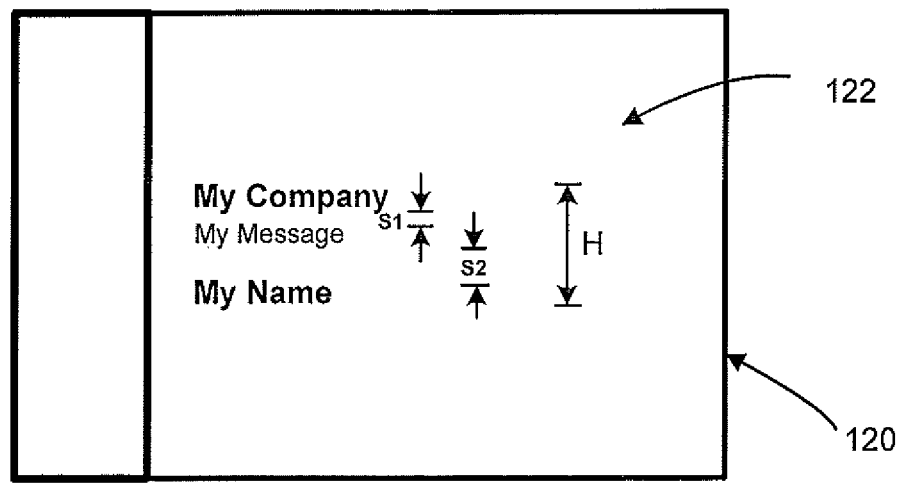
Figure 7C:
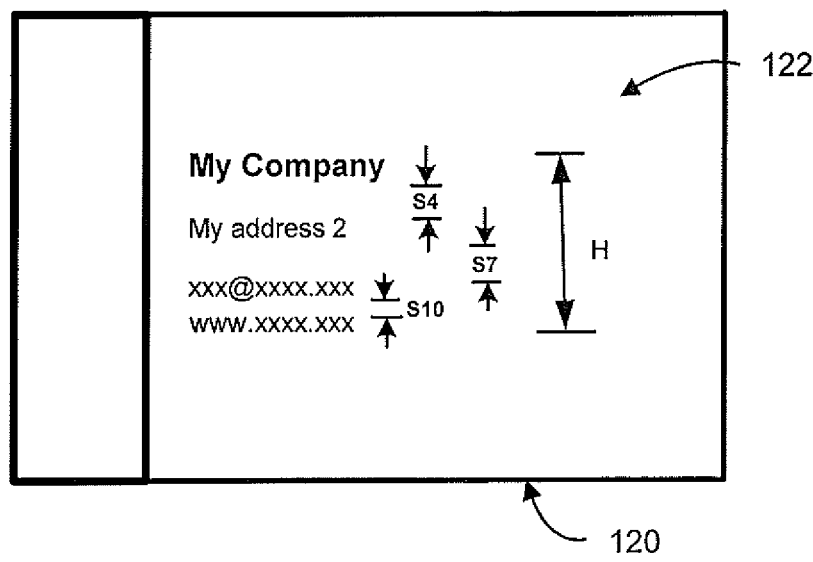
Figure 7D:
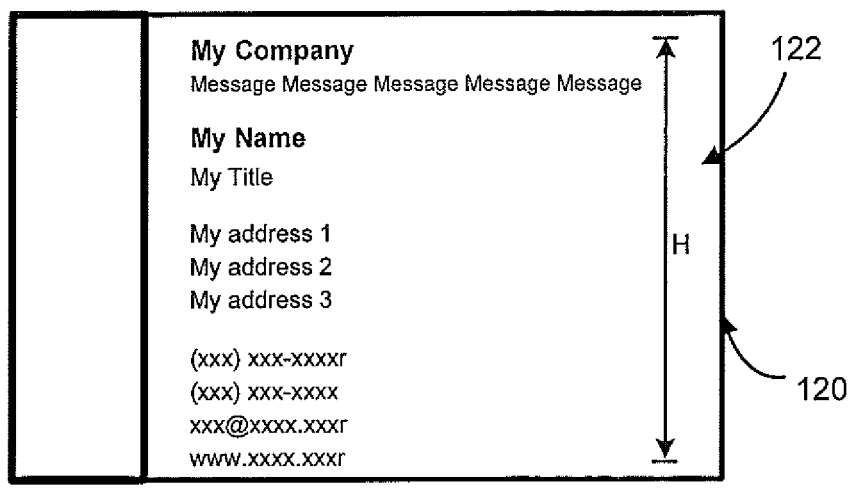

In FIGS. 7B-7D, discussed below, the outlines of the textboxes containing the text entries are omitted for clarity of illustration. FIG. 7B illustrates the layout result if the user were to enter "My Company" in text field 101, "My Message" in text field 102 and "My Name" in text field 103, leaving all other text fields empty, and select Preview 130. In this case, the total height H is the sum of the heights of the associated textboxes 501, 502, and 503 plus the spacing distances S1 and S2. The textboxes are then positioned in text area 122 such that substantially one-half of the total height H is above the horizontal centerline of the text area and one-half is below.

As mentioned above, the group spacing is maintained as long as even one textbox of a group contains text. For example, if the user were to have entered text only in text fields 101, 106, 110 and 111, that text would be arranged as shown in FIG. 7C. The text "My address 2" in textbox 506 is separated from "My Company" in textbox 501 by group spacing distance S4. Similarly, the entry "xxx@xxxx.xxx" in textbox 510 is separated from "My address 2" in textbox 506 by group spacing distance S7. The total height H in this situation is therefore equal to the total of the heights of the four textboxes 501, 506, 510 and 511 plus the spacing distances S4, S7 and S10. Again, the four textboxes are positioned in text area 122 such that substantially one-half of H is above the horizontal centerline and one-half below. It will be appreciated that it is not essential that the textboxes always be vertically centered in text area 122. Other positioning techniques could be employed, if desired by the service provider.

Referring again to FIG. 6, it is possible that the total height of the textboxes and textbox spacing determined at step 603 will exceed the maximum allowable height. This would typically occur because the user entered more text in one or more text fields 101-111 than can be rendered on a single line at the default font size and font characteristics for that textbox. Each textbox has a defined width that is, of course, limited by the physical boundaries of the product being designed. If a user enters more text than can be printed on a single line, the text will automatically wrap onto another line, thereby increasing the height of the textbox.

It can be appreciated that textboxes with multiple lines will not automatically require a reduction in the font size or textbox spacing. In some situations, the user may have left one or more text fields 101-111 empty, thereby leaving sufficient vertical space available to accommodate one or more multiline textboxes. Font size and spacing reductions are only needed if the total of the heights of the textboxes with text, plus the spacing distances, exceeds the maximum height available for user text.

If it is detected at step 603 that the total height of the textboxes and spacing exceeds the maximum allowable height, the current font sizes and spacing distances are checked at step 606 to determine if they are already at the size identified by the printing services provider as being the minimum that provides an attractive and legible product. If the font sizes and spacing distances are not at the minimum, at step 607 the font size for all textboxes are reduced by one point size or, if font sizes are defined in pixels, by one pixel. If the font sizes have been reduced to their minimums, the spacing distances between all textboxes are incrementally reduced by one pixel until the spacing distances reach their defined minimums. If the fonts and spacing are both at the minimums, an alert is generated at step 608 to notify the user that an acceptable automated layout cannot be generated. It will be understood that various alternate techniques of incremental reductions could be employed, for example: maintaining fixed spacing distances and incrementally reducing only the font sizes, alternately reducing font size and spacing size until both are at their minimums, reducing the font sizes or spacing for only some textboxes instead of all, or reducing font sizes in a proportional manner such that larger fonts sizes are reduced by a proportionally greater number of pixels than smaller font sizes.

After each reduction at step 607, the combined heights of the textboxes and spacing distances are then recalculated at step 602 to determine if they no longer exceed the maximum allowable height at step 603. Steps 602, 603, 606 and 607 are repeated until either the total height no longer exceeds the maximum allowable height or the fonts and spacing distances are at the minimum allowable size as identified by the service provider.

As an example, if all text fields 101-111 contain text entries and a text string that is too long to be rendered on a single line at the initial font size specified for textbox 502, such as, for illustration, "Message Message Message Message Message", were entered in text field 102, the text would be wrapped onto two lines in textbox 502. The resulting increased height of textbox 502 would, in this case, cause the overall total height of all textboxes to exceed the maximum. The font size and spacing of all textboxes would then be reduced incrementally until either the total height of all textboxes does not exceed the maximum available height, for example as depicted in FIG. 7D, or the font size and spacing distances are at the predefined minimums and cannot be further reduced without unacceptable degradation in the quality or usefulness of the design.

Figure 8A:
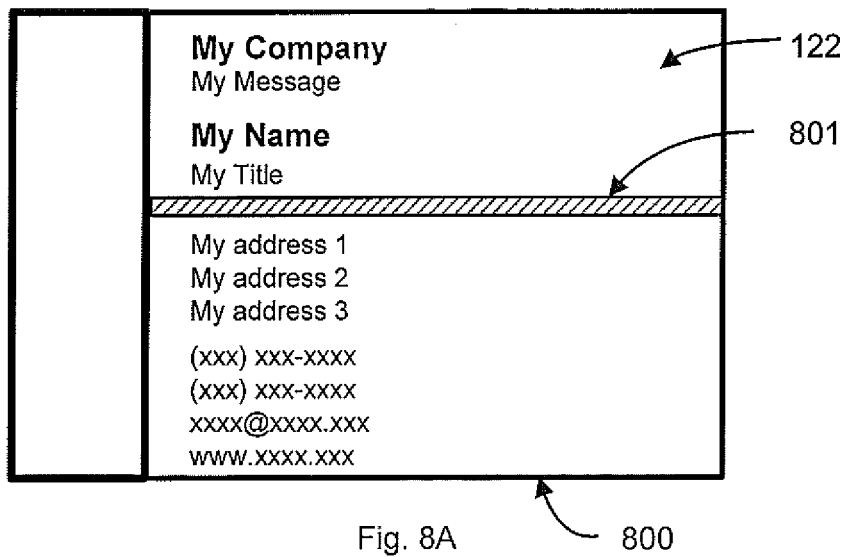
FIG. 8A-8B depict an alternate embodiment incorporating a design element in the template text area.
Figure 8B:
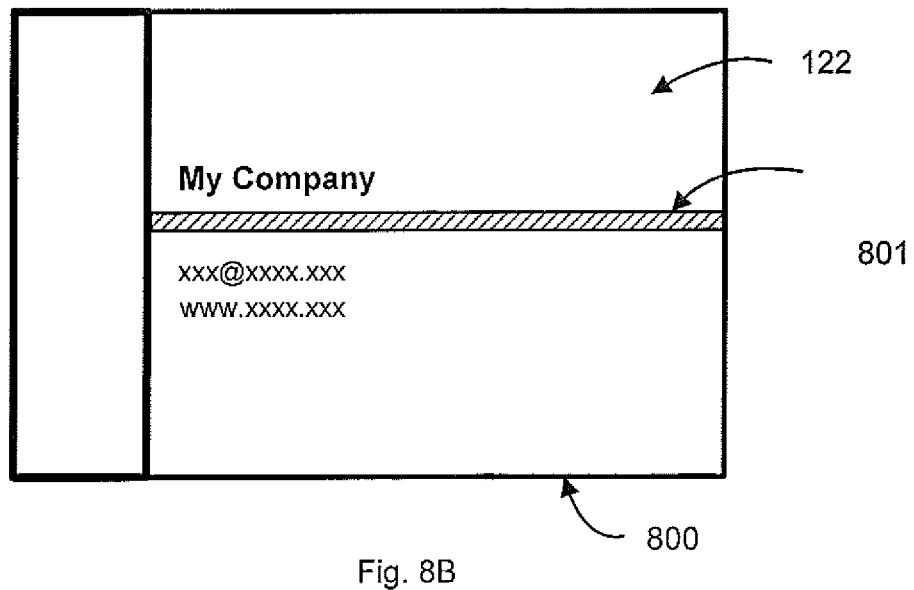

The invention is not limited to dynamic positioning only of textboxes. One or more design elements, for example lines, shapes, images, or other design features, could be similarly vertically positioned within text area 122 according to which and how many text fields are completed by the user. FIGS. 8A and 8B show two examples of a business card template 800 containing design element 801. Element 801 is assigned a relative position and spacing distance between the user entries in the top four textboxes and the user entries in the bottom seven textboxes. Like the vertical positions of the textboxes containing user text, the vertical position of element 801 in template 800 is not fixed, but is determined by the number and heights of the textboxes containing user data. Referring to step 603 of FIG. 6, the height and associated spacing of element 801 is added to the heights of the textboxes and related spacing to calculate the total height of all text area elements.

Figure 9:
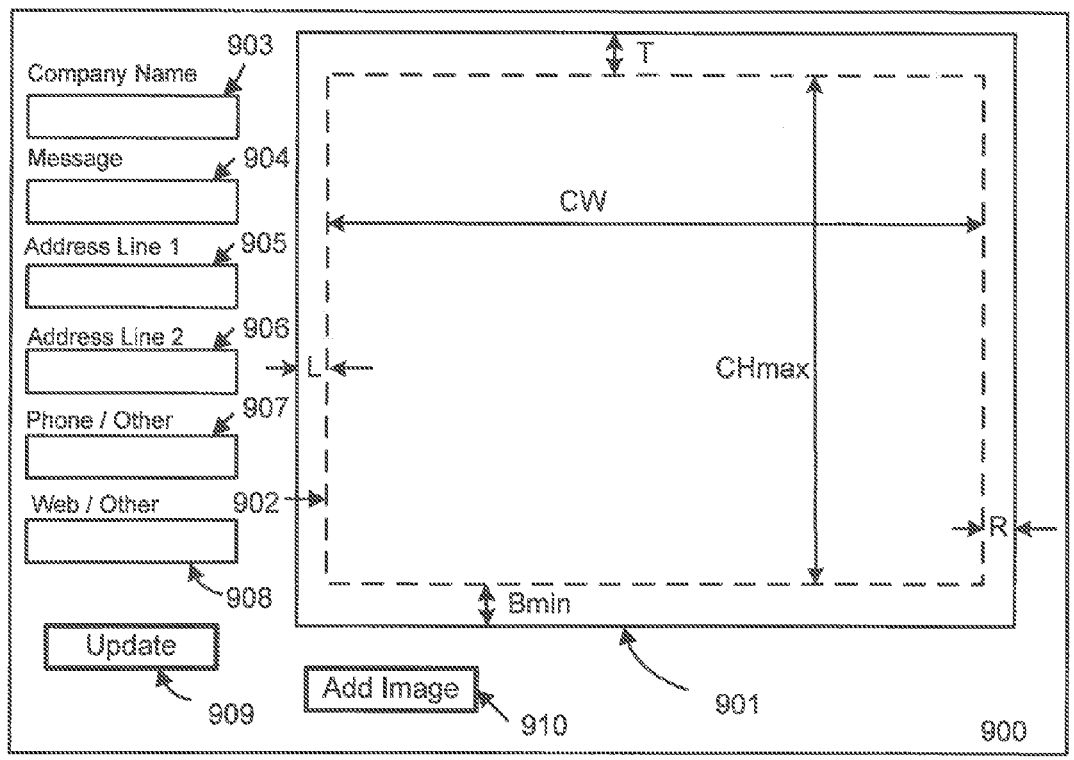
FIG. 9 shows an initial document customization screen for product 900.

The above described techniques for text positioning can be used in combination with resizable and/or croppable content elements to automatically position text and content elements in an electronic product design. FIG. 9 depicts a representative design display 900 for allowing a user to design a custom product with user-supplied text and/or a user selected image in addition to content already incorporated into the product design by the printing services provider. Screen 900 displays the initial design of a product 901 for user review. Product 901 could be, for example, a page of a calendar, a page of a photobook, or other product or portion of a product. Product 901 contains content area 902, which could be filled with a single element, for example a photograph or a calendar, or could contain multiple elements, for example a photograph and a calendar arranged side by side, depending on the type of product selected by the user from the products offered by the printing services provider.

In the situation depicted in FIG. 9, content area 902 has a content width CW and, because no user content has been incorporated into the design of product 901, has the maximum possible content area height, indicated in FIG. 9 as CHmax. As will be discussed below, the width of content area 902 will remain constant as the user adds content, but the height of area 902 can vary. In this example, content area 902 is separated from the physical edge of product 901 by a top distance T, a right side distance R, a left side distance L, and a minimum bottom distance Bmin. The size of these distances is determined by the printing services provider and can be different for different product designs. As the user supplies content for incorporation into the product 901 design, T, L and R will remain constant, but the bottom distance B between the lower edge of content area 902 and the lower edge of the product 901 will vary as necessary to accommodate the user's content.

Text entry fields 903-908 are provided for the user on screen 900. In this example, the fields are intended to assist a business user in preparing a customized product for the user's commercial or promotional use. Each field has an informative label identifying the suggested content of that text field, though the user is free to enter whatever information the user desires and free to leave some or all of the fields empty. Each text field has associated default font parameters that will control how the text entered into that field will be rendered in product design 901. For example, the company name and message entries in fields 903 and 904 would typically be rendered in larger fonts than the contact information entries in fields 905-908.

When the user has entered the user's text in fields 903-908, the user can click Update button 909 to cause Design Tools 306 to update product design 901 with the user's text. As will be described below, Add Image button 910 allows the user to select an image for incorporation into product design 901.

Figure 10:
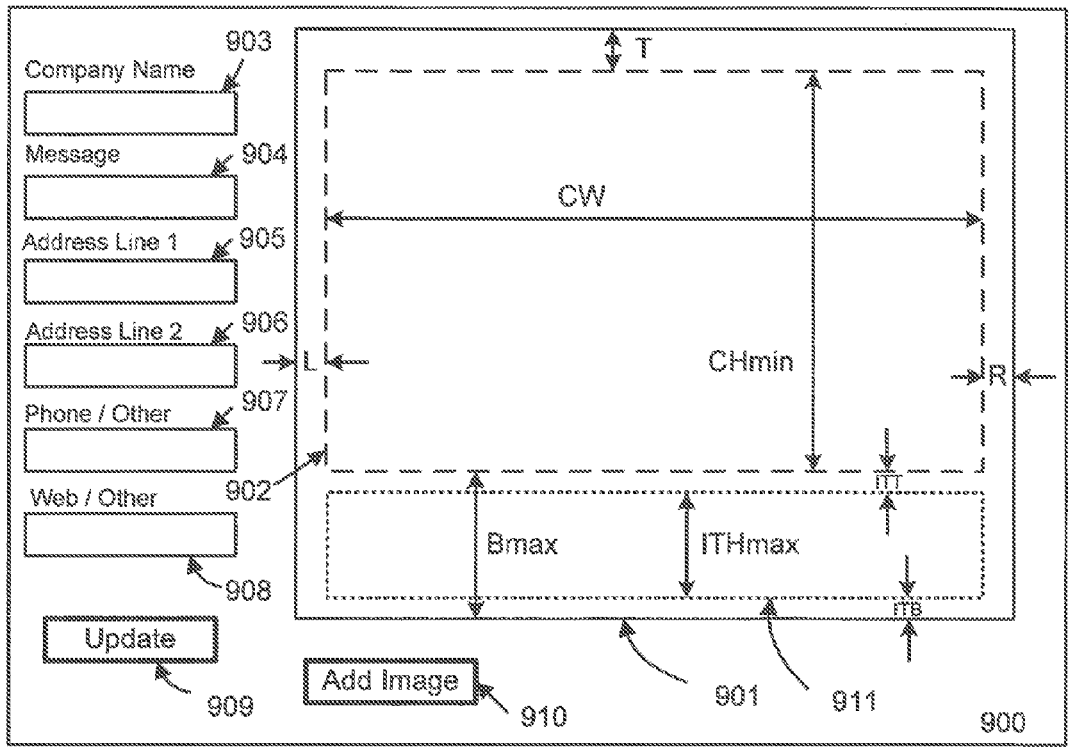
FIG. 10 shows the document customization screen of FIG. 9 wherein the design of product 900 contains image/text area 911.

The user's text and added image will be incorporated into product design 901 in an area of the product design represented in FIG. 10 as image/text area 911. In this example, the width of image/text area 911 is set to be equal to the width of content area 902. The height of the width/text area (ITH) can be one of several different possible heights varying between a minimum height of zero, as depicted in FIG. 9, which will be the case if the user has not entered any text and has not added an image, and a maximum height of ITHmax, as depicted in FIG. 10. As the height of image/text area 911 increases, the height CH of content area 902 is correspondingly reduced. The printing services provider can place a limit on the range within which the heights of content area 902 and image/text area 911 can vary. For example, the service provider could establish that CHmin is 80% of CHmax.

The manner of modifying the image content of content area 902 will depend on the type of content. For example, if content area 902 contains a photograph, a cropped version of the photograph having the appropriate height could be created. Various cropping techniques could be employed. For example, a single cropping technique could be used for all images, such as cropping equally from the top and bottom, or the printing service provider could provide individual cropping rules for each image based on image content to cause the image to be cropped only from the top, only from the bottom, or cropped from both top and bottom in unequal amounts. If content area 902 contains content that can be readily resized, such as a vector description of a calendar, a new version of the content having the appropriate aspect ratio can be generated to fit the available content area 902. Both methods can be employed if content area 902 contains both types of content.

Image/text area 911 is separated from content area 902 by separation distance ITT and is separated from the bottom edge of product design 901 by separation distance ITS. These distances can be set to whatever values are desired by the printing services provider.

Figure 11A:
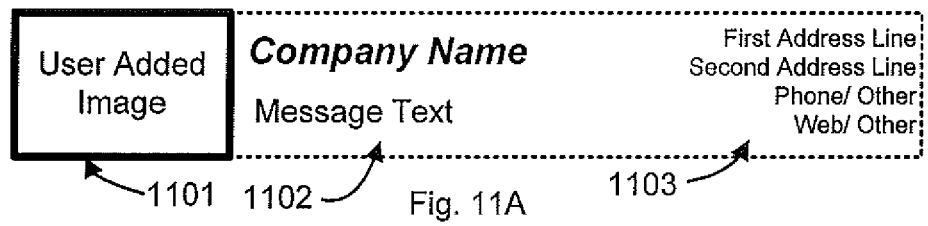
FIGS. 11A-11G depict illustrative examples of various image/text areas 911 containing different combinations of user-supplied image and text.

Because the user can enter text in none, all, or any combination of text fields 903-908 and because the user can choose to add or not add an image, many possible image/text area 911 configurations are possible. For illustration, FIGS. 11A-G depict examples of image/text areas 911 created from various user input combinations. Referring to FIG. 11A, an example of an area 911 with user content supplied in all fields and an added image is depicted. As discussed above in connection with FIG. 5, each text entry will have an associated text height, depending on the font size and other parameters associated with that text field by the service provider.

Figure 11B:
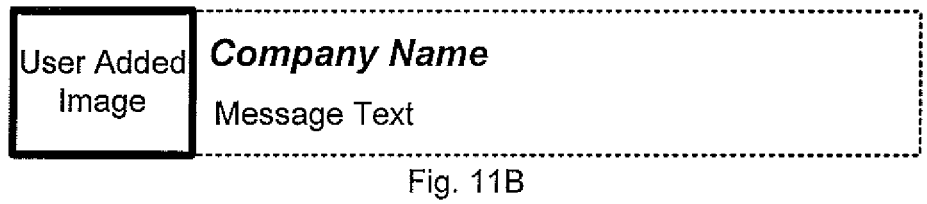
Figure 11C:
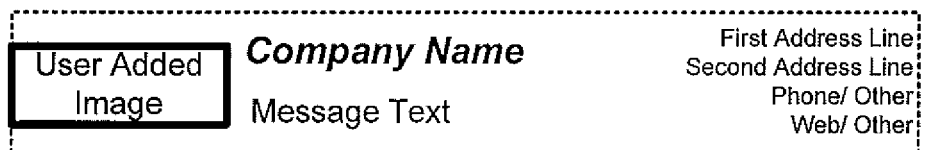
Figure 11D:
Figure 11E:
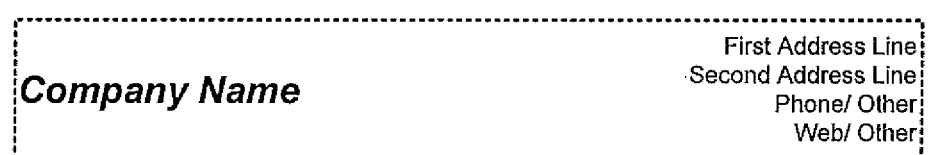

User inputs are divided into one of three types: an added image 1101, left justified text entries 1102, and right justified text entries 1103. In this embodiment, the added image, if any, is positioned at the left edge of image/text area 911. If an image has been added, text entered in fields 903 and 904 is left justified relative to the added image, as depicted in FIGS. 11A-11C. If no image has been added, text entered in fields 903 and 904 is left justified relative to the left edge of area 911, as depicted in FIGS. 11D and 11E. Text entered in fields 905-908 is right justified relative to the right edge of area 911. It will be appreciated that other arrangements of added images and text could be employed.

Figure 11F:
Figure 11G:
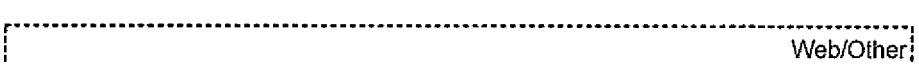

The height ITH of area 911 will vary based on the particular user-supplied content. For example, as depicted in FIG. 11g, if the user only supplied an entry in field 908, ITH would be the height of that one text entry.

The height of image/text area 911 is determined by whichever of the types of user input has the greatest height. Based on the particular user inputs, this could be the added image, the left justified text entries or the right justified text entries. The content of the entries with less height are substantially centered vertically within the overall area 911 height, for example as illustrated in FIGS. 11C, 11E and 11F.

Figure 12A:
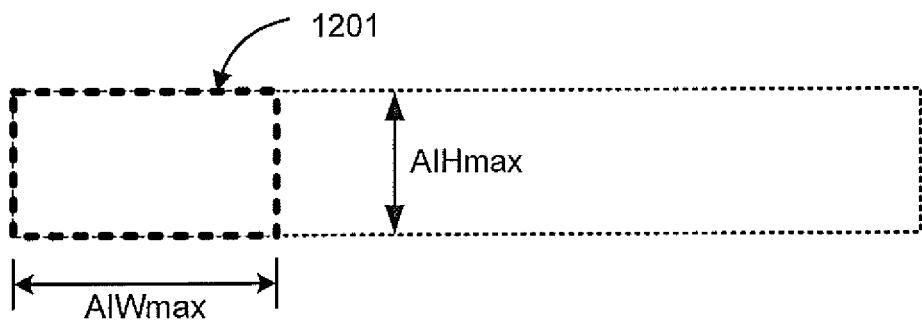
FIGS. 12A-12C illustrate the incorporation of an image into an image/text area.
Figure 12B:
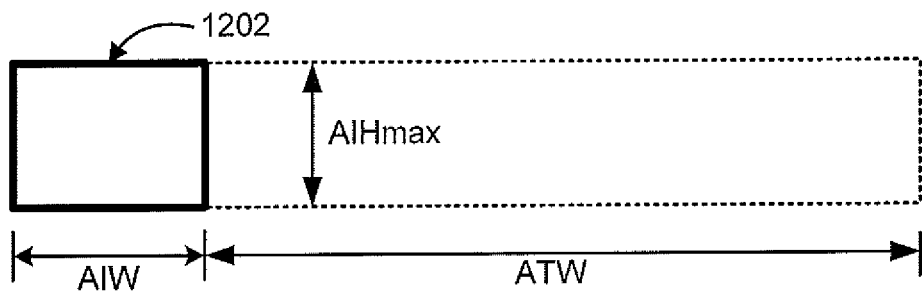
Figure 12C:
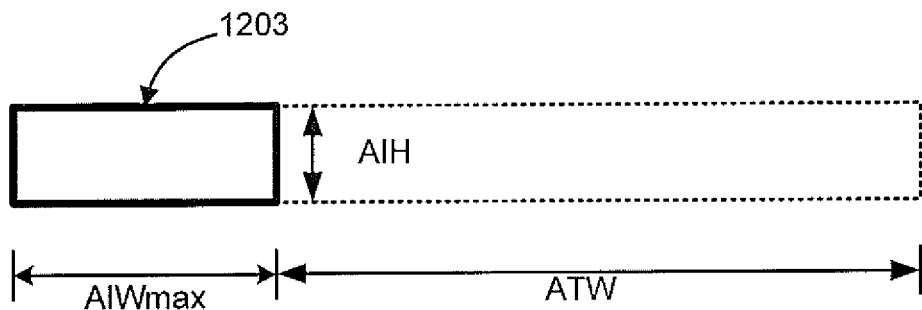

Referring to FIGS. 12A-12C, any image added by the user must fit within a maximum added image area 1201, set by the service provider. The maximum added image height AIHmax will typically be equal to the maximum image/text area height ITHmax, but could be different if desired by the service provider. The added image is resized to fit entirely within image area 1201. Depending on the aspect ratio of the added image, the resulting image incorporated into design 901 could be smaller than the maximum area 1201 either horizontally, as indicated in FIG. 12B, or vertically, as indicated in FIG. 12C.

The portion of the image/text area that is available for displaying the user's text is referred to herein as available text width (ATW). The ATW is determined by subtracting the width of the user's added image AIW, if any, from the width of the image/text area. If no user image has been added, the entire width of the image/text area is available for user text.

Figure 13:
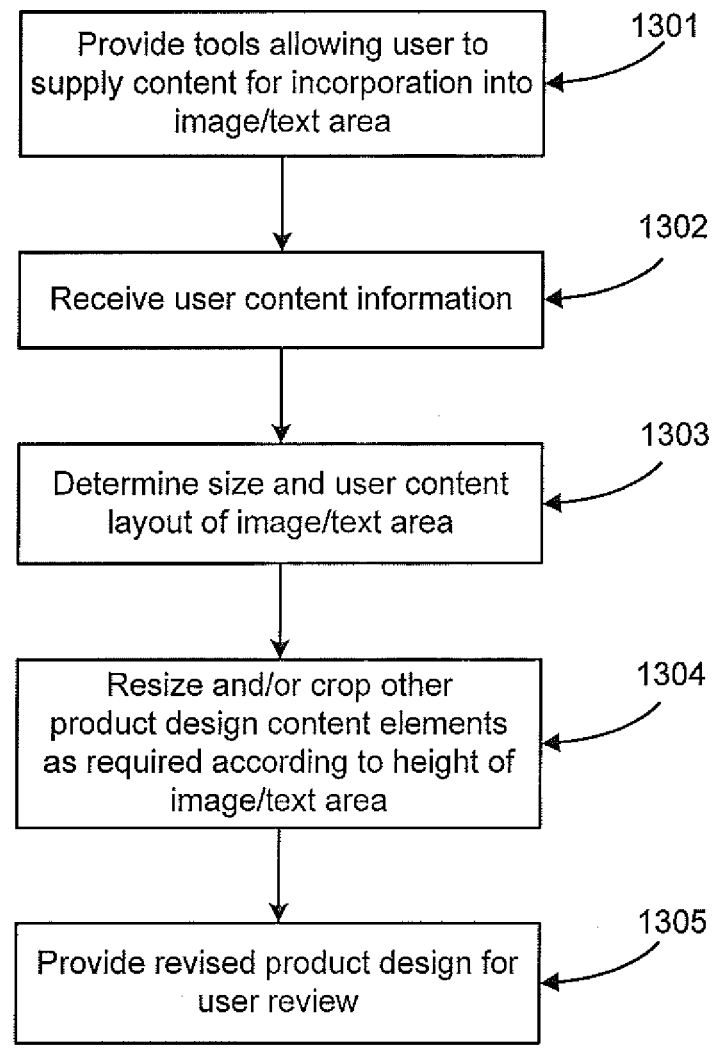
FIG. 13 is a flow diagram illustrating a method for incorporating user inputs into an image/text area in a product design.

An illustrative embodiment of the method for modifying product design 901 to accommodate user input is shown in FIG. 13. At step 1301, the printing service provider makes tools available to allow the user to provide custom content for the product. In this example, the user can supply text entries using text fields 903-908 and/or select an image for incorporation using Add Image button 910. The user inputs are received at step 1302 and the height and layout of the image/text area is determined at step 1303, as will be discussed in more detail below. At step 1304, the other content elements in the product design are sized or cropped, as appropriate for the type of content element involved, according to the height of the image/text area determined at step 1303. At step 1305, a revised product design incorporating the user's inputs is provided for user review.

Figure 14:
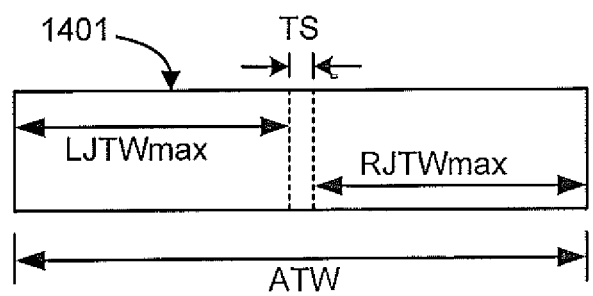
FIG. 14 illustrates one technique for determining text positions in the available text area in an image/text area.

Because the right justified and left justified text entries are positioned in a horizontal arrangement, constraints must be applied to prevent the user from inadvertently entering creating an unsatisfactory design by entering lengthy strings of characters such that the right end of a left justified text string overlaps the left end of the right justified text. One possible constraint technique is depicted in FIG. 14. Once the ATW is determined by subtracting the width of the user's added image, if any, from the maximum width of the image/test area, the ATW is divided into a maximum left justified text width (LJTWmax) and a maximum right justified text width (RJTWmax). LJTWmax and RJTWmax could be set to be equal or could be different. To ensure that text strings in the two text areas do not appear unacceptably close to each other, a minimum text separation distance TS is established.

Figure 15:
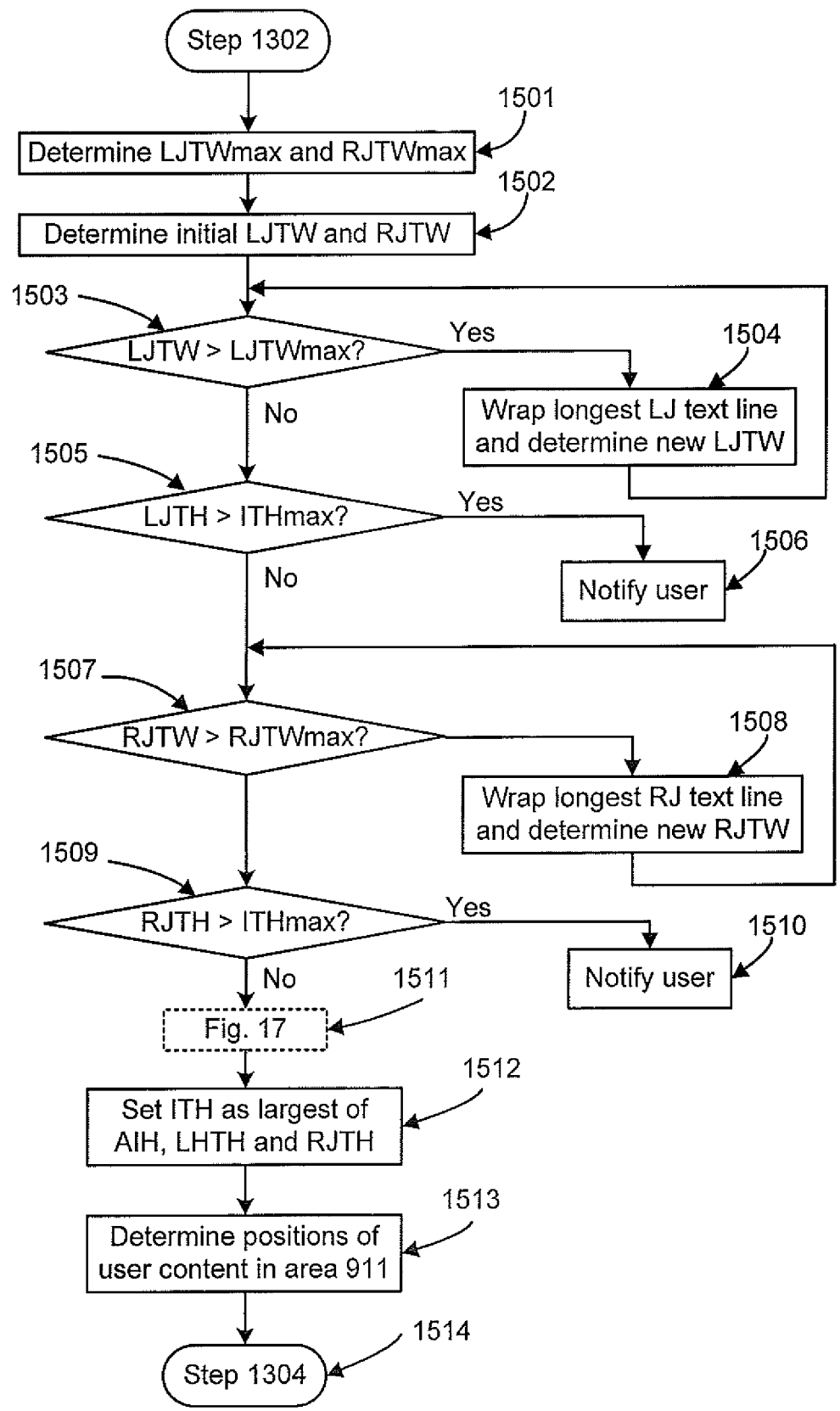
FIG. 15 is a flow diagram illustrating a method for processing user-provided content in accordance with the technique of FIG. 14.

FIG. 15 depicts an embodiment of step 1303 for the technique example illustrated in FIG. 14. After the user's inputs have been received (step 1302 in FIG. 13), LJTWmax and RJTWmax are determined at step 1501, as mentioned above. At step 1502, the left justified text width LJTW is determined by determining the longest length of any user-supplied text in the text fields to be left justified, in this example, fields 903 and 904. It is possible that the user has entered relatively long strings of text in one or both of fields 903 and 904 such that the length of one or both text strings exceeds LJTWmax. If LJTW exceeds LJTWmax at step 1503, the final word or other set of related characters at the end of the longest of the left justified text strings is wrapped onto another line. Because wrapping divides the longest text entry onto two lines, this has the effect of reducing the LJTW. After a wrapping operation, the new LJTW may still exceed the LJTWmax, therefore steps 1503 and 1504 are repeated until the text entries in fields 903 and 904 have been wrapped such that LJTW is less than or equal to LJTWmax. Of course, wrapping of text onto multiple lines causes the overall height of the left justified text entries LJTH to increase, therefore LJTH must also be checked at step 1505 to determine if the wrapping operation has resulted in an LJTH that exceeds the allowable maximum height ITHmax of the image/text area. If LJTH exceeds ITHmax, the user is notified at step 1506 that the user's text entries are too large to be accommodated. Steps 1507-1510 relating to the right justified text entries are similar to the left justified text steps 1503-1507. It will be understood that the depicted sequence of executing these steps is not essential.

Step 1511 in FIG. 15 represents additional processing steps that are not required for the technique depicted in FIG. 14, but may be combined with the other steps of FIG. 15 to handle an alternate technique discussed below in connection with FIGS. 16 and 17.

At step 1508, ITH, the height of the image/text area, is determined as being the largest of LJTH, RJTH and the added image height IH. The vertical position of the user's content in the image/text area is then determined based on this ITH. As mentioned above in connection with FIGS. 11A-11G, the user input types having a height less than ITH are substantially centered vertically within the image/text area.

Figure 16A:
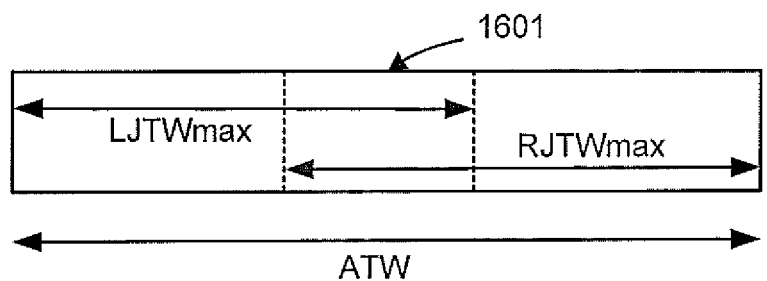
FIGS. 16A-16D illustrate another technique for determining text positions in the available text area in image/text area 911.
Figure 16B:
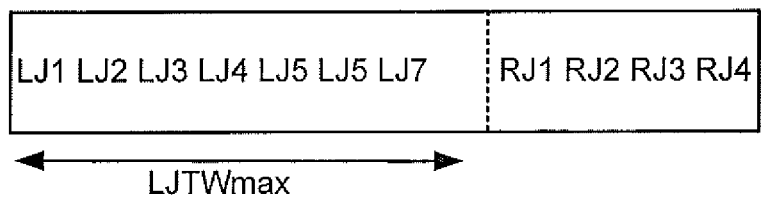
Figure 16C:
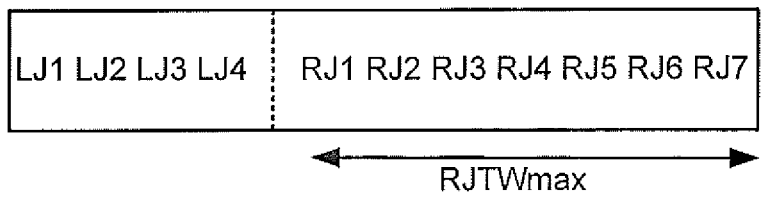

An alternative technique for determining text position in the available text width ATW is depicted in FIG. 16A. In this example, to provide greater flexibility for user inputs, the service provider can establish values of the maximum left justified text width (LJTWmax) and the maximum right justified text width (RJTWmax) that exceed ATW. In other words, both LJTWmax and RJTWmax could be set to be greater than 50% of ATW and could, if desired by the service provider, be set to be equal to the entire width of the image/ text area. This would allow for a wider range of text lengths and text arrangements, such as illustrated in FIGS. 16B and 16C, but creates the possible of undesirable overlapping of left and right justified text entries, even in the situation where LJTW is less than LJTWmax and RJTW is less than RJTWmax. To avoid this outcome requires additional steps not required in the method of FIG. 15 where RJTWmax and LJTWmax could not exceed ATW.

Figure 16D:
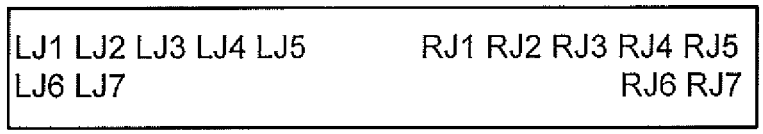
Figure 17:
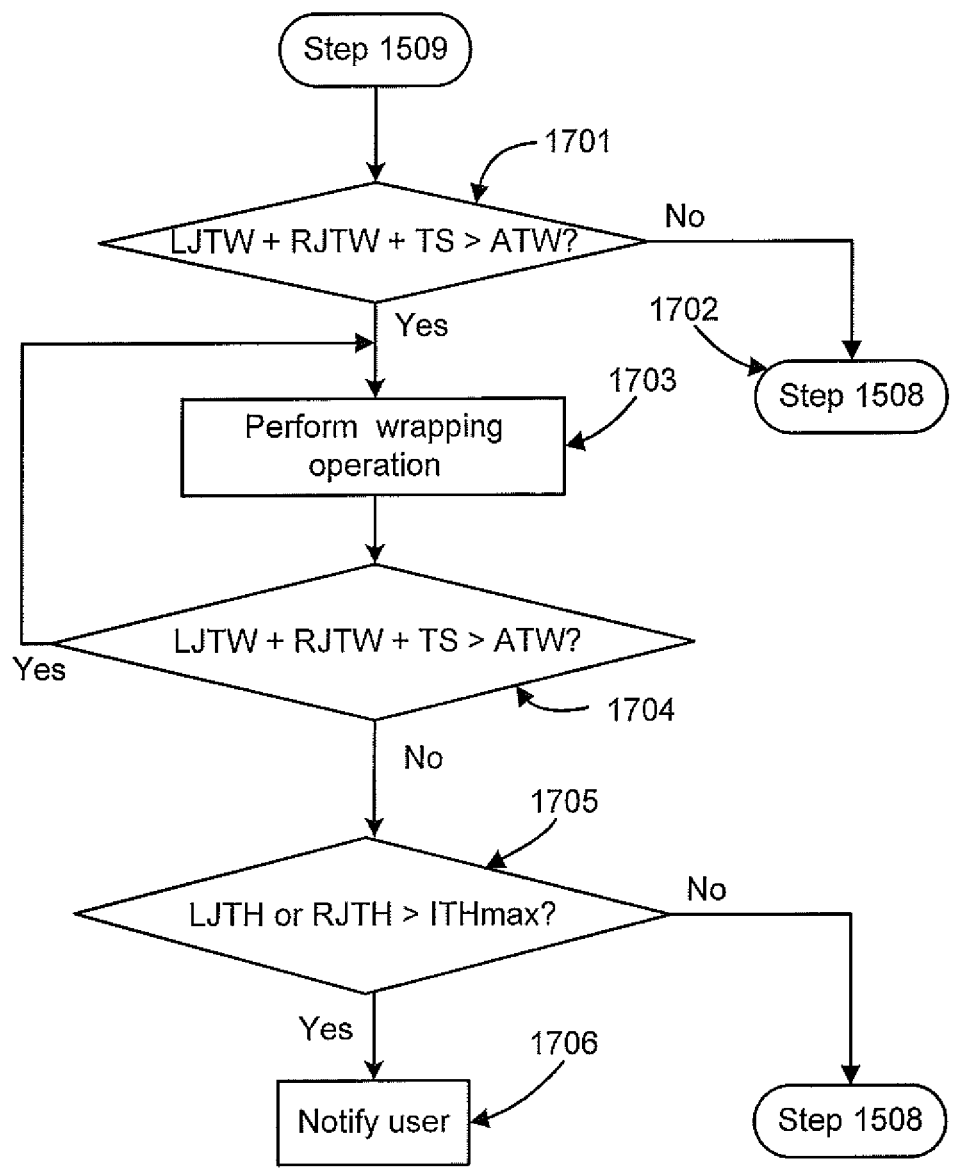
FIG. 17 is a flow diagram illustrating additional steps for processing user-provided content in accordance with the technique of FIGS. 16A-16C.

One embodiment of the additional steps, indicated as step 1511 in FIG. 15, is depicted in FIG. 17. At step 1701, if LJTW plus RJTW plus any required separation distance TS established by the service provider does not exceed ATW, there is no overlapping issue and processing can proceed to step 1508. If, however, ATW is exceeded, the final word or character group in the longest text line is wrapped onto another line at step 1703 to reduce LJTW or RJTW and the sum of LJTW, RJTW and TS is again calculated at step 1703. This iterative wrapping and testing process repeats until the sum of LJTW, RJTW and TS meets the total length constraint at step 1704. As discussed above, each wrap of text onto a new line increases the total height of the text entries of that type, therefore the height of both the left justified text entries and the right justified text entries must be checked to ensure that the maximum allowable height ITHmax constraint is met. The amount of wrapping that can be tolerated depends on the number of fields 903-908 that contain user text entries. For example, in a case where fields 905-908 all have text entries, for example as shown in FIG. 11A, wrapping of any of the four text entries may violate the height constraint. On the other hand, if one or more text fields in a text type have been left empty by the user, for example as shown in FIGS. 11E-11G, this provides vertical space for the fields that do contain text to be wrapped onto additional lines without violating the overall height constraint of ITHmax. If the user's text cannot be incorporated into the image/text area without violating the height constraint, the user is notified at step 1706 that the user's text entries cannot be accommodated. To illustrate a possible final layout, FIG. 16D illustrates a simple example where the user entered the long left justified text string shown in FIG. 16B (LJ1-LJ7) in text field 903 or 904 and entered the long right justified text string shown in FIG. 16C (RJ1-RJ7) in text field 905, 906, 907 or 908.

While the invention has been shown and described in various exemplary embodiments, the described embodiment is to be considered as illustrative rather than restrictive. For example, the design being customized could be for a product to be printed on paper or on any other printable medium such as cloth, glass, plastic, rubber, or wood. The design could be for a complete product, or intended to be incorporated into a larger product, such as a section, side, or page. The scope of the invention is as indicated in the following claims and all equivalent methods and apparatus.

What is claimed is:

1. A method for justifying a plurality of text entries in a content area, the content area of predetermined content area width and determined maximum height, the content area having a text area of having a known available text width, the text area having a first text area portion for receiving text entries of a first horizontal alignment type and a second text area portion for receiving text entries of a second horizontal alignment type, the first text area and the second text area arranged horizontally with respect to one another in the text area, the first text area portion characterized by a first text area portion width corresponding to a first maximum justified text width and the second text area portion characterized by a second text area portion width corresponding to a second maximum justified text width, the method comprising:

receiving a plurality of text entries, the plurality of text entries comprising at least one text entry being of a first horizontal alignment type and at least one text entry being of a second horizontal alignment type;

inserting the received text entries of the first horizontal alignment type into the first text area portion of the text area;

justifying the inserted text entries of the first horizontal alignment type within the first text area according to the first horizontal alignment type;

inserting the received text entries of the second horizontal alignment type into the second text area portion of the text area;

justifying the inserted text entries of the second horizontal alignment type within the second text area according to the second horizontal alignment type;

iteratively identifying the line of text in the first text area portion having the longest length text string, determining whether the width of the longest length text string exceeds the first maximum justified text width, wrapping the identified line of text in the first text area portion onto one or more succeeding lines in the first text area, and repeating until the width of the longest length text string in the first text area does not exceed the first maximum justified text width; and iteratively identifying the line of text in the second text area portion having the longest length text string, determining whether the width of the longest length text string exceeds the second maximum justified text width, wrapping the identified line of text in the second text area portion onto one or more succeeding lines in the second text area, and repeating until the width of the longest length text string in the second text area does not exceed the second maximum justified text width.

2. The method of claim 1, further comprising:

providing notification that the received text entries are too large to fit if the lines of text in the first text area or the lines of text in the second text area exceed a maximum height.

3. The method of claim 1, wherein the total sum of the first maximum justified text width and the second maximum justified text width exceeds the available text width.

4. The method of claim 3, further comprising:

upon entry of the one or more user text entries of the first horizontal alignment type and the one or more user text entries of the second horizontal alignment type:

determining the actual width of the one or more user text entries of the first horizontal alignment type and the actual width of the one or more user text entries of the second horizontal alignment type, and if the sum of the actual width of the one or more user text entries of the first horizontal alignment type and the actual width of the one or more user text entries of the second horizontal alignment type exceeds the available text width, wrapping at least one of the user text entries of the first horizontal alignment type and or the user text entries of the second horizontal alignment type.

5. The method of claim 4, comprising:

repeating the determining step and the wrapping step until the sum of the actual width of the one or more user text entries of the first horizontal alignment type and the actual width of the one or more user text entries of the second horizontal alignment type does not exceed the available text width.

6. The method of claim 4, the wrapping step further comprising:
    determining which of the actual width of the one or more user text entries of the first horizontal alignment type and the actual width of the one or more user text entries of the second horizontal alignment type is greater; and
    wrapping at least one of the user text entries of the horizontal alignment type corresponding to the one or more text entries of the horizontal alignment type having the greater actual width.

7. The method of claim 4, further comprising:
    determining whether the wrapped text violates a height constraint associated with the content area, and
    notifying the user that the one or more text entries do not fit in the content area.

8. The method of claim 1, wherein the first maximum justified text width and the second maximum justified text width are equal.

9. The method of claim 1, wherein the first maximum justified text width and the second maximum justified text width are different.

10. One or more nontransitory computer readable storage mediums tangibly embodying program instructions which, when executed by one or more processors, implement a method for justifying a plurality of text entries in a content area, the content area of predetermined content area width and determined maximum height, the content area having a text area of having a known available text width, the text area having a first text area portion for receiving text entries of a first horizontal alignment type and a second text area portion for receiving text entries of a second horizontal alignment type, the first text area and the second text area arranged horizontally with respect to one another in the text area, the first text area portion characterized by a first text area portion width corresponding to a first maximum justified text width and the second text area portion characterized by a second text area portion width corresponding to a second maximum justified text width, the method comprising:
    receiving a plurality of text entries, the plurality of text entries comprising at least one text entry being of a first horizontal alignment type and at least one text entry being of a second horizontal alignment type;
    inserting the received text entries of the first horizontal alignment type into the first text area portion of the text area;
    justifying the inserted text entries of the first horizontal alignment type within the first text area according to the first horizontal alignment type;
    inserting the received text entries of the second horizontal alignment type into the second text area portion of the text area;
    justifying the inserted text entries of the second horizontal alignment type within the second text area according to the second horizontal alignment type;
    iteratively identifying the line of text in the first text area portion having the longest length text string, determining whether the width of the longest length text string exceeds the first maximum justified text width, wrapping the identified line of text in the first text area portion onto one or more succeeding lines in the first text area, and repeating until the width of the longest length text string in the first text area does not exceed the first maximum justified text width; and
    iteratively identifying the line of text in the second text area portion having the longest length text string, determining whether the width of the longest length text string exceeds the second maximum justified text width, wrapping the identified line of text in the second text area portion onto one or more succeeding lines in the second text area, and repeating until the width of the longest length text string in the second text area does not exceed the second maximum justified text width.

11. The one or more nontransitory computer readable storage mediums of claim 10, the method further comprising:
    providing notification that the received text entries are too large to fit if the lines of text in the first text area or the lines of text in the second text area exceed a maximum height.

12. The one or more computer readable storage mediums of claim 11, wherein the total sum of the first maximum justified text width and the second maximum justified text width exceeds the available text width.

13. The one or more computer readable storage mediums of claim 12, the method further comprising:
    upon entry of the one or more user text entries of the first horizontal alignment type and the one or more user text entries of the second horizontal alignment type:
    determining the actual width of the one or more user text entries of the first horizontal alignment type and the actual width of the one or more user text entries of the second horizontal alignment type, and
    if the sum of the actual width of the one or more user text entries of the first horizontal alignment type and the actual width of the one or more user text entries of the second horizontal alignment type exceeds the available text width, wrapping at least one of the user text entries of the first horizontal alignment type and or the user text entries of the second horizontal alignment type.

14. The one or more computer readable storage mediums of claim 13, the method comprising:
    repeating the determining step and the wrapping step until the sum of the actual width of the one or more user text entries of the first horizontal alignment type and the actual width of the one or more user text entries of the second horizontal alignment type does not exceed the available text width.

15. The one or more computer readable storage mediums of claim 13, the wrapping step further comprising:
    determining which of the actual width of the one or more user text entries of the first horizontal alignment type and the actual width of the one or more user text entries of the second horizontal alignment type is greater; and
    wrapping at least one of the user text entries of the horizontal alignment type corresponding to the one or more text entries of the horizontal alignment type having the greater actual width.

16. The one or more computer readable storage mediums of claim 13, the method further comprising:
    determining whether the wrapped text violates a height constraint associated with the content area, and
    notifying the user that the one or more text entries do not fit in the content area.

17. A system for justifying a plurality of text entries in a content area, the content area of predetermined content area width and determined maximum height, the content area having a text area of having a known available text width, the text area having a first text area portion for receiving text entries of a first horizontal alignment type and a second text area portion for receiving text entries of a second horizontal alignment type, the first text area and the second text area arranged horizontally with respect to one another in the text area, the first text area portion characterized by a first text area portion width corresponding to a first maximum justified text width and the second text area portion characterized by a second text area portion width corresponding to a second maximum justified text width, comprising:
- one or more processors,
- one or more computer readable storage mediums tangibly embodying program instructions which, when executed by the one or more processors, implement steps of
- receiving a plurality of text entries, the plurality of text entries comprising at least one text entry being of a first horizontal alignment type and at least one text entry being of a second horizontal alignment type;
- inserting the received text entries of the first horizontal alignment type into the first text area portion of the text area;
- justifying the inserted text entries of the first horizontal alignment type within the first text area according to the first horizontal alignment type;
- inserting the received text entries of the second horizontal alignment type into the second text area portion of the text area;
- justifying the inserted text entries of the second horizontal alignment type within the second text area according to the second horizontal alignment type;
- iteratively identifying the line of text in the first text area portion having the longest length text string, determining whether the width of the longest length text string exceeds the first maximum justified text width, wrapping the identified line of text in the first text area portion onto one or more succeeding lines in the first text area, and repeating until the width of the longest length text string in the first text area does not exceed the first maximum justified text width; and
- iteratively identifying the line of text in the second text area portion having the longest length text string, determining whether the width of the longest length text string exceeds the second maximum justified text width, wrapping the identified line of text in the second text area portion onto one or more succeeding lines in the second text area, and repeating until the width of the longest length text string in the second text area does not exceed the second maximum justified text width.

18. The system claim 17, wherein the total sum of the first maximum justified text width and the second maximum justified text width exceeds the available text width, the program instructions further implementing steps of:
- upon entry of the one or more user text entries of the first horizontal alignment type and the one or more user text entries of the second horizontal alignment type:
- determining the actual width of the one or more user text entries of the first horizontal alignment type and the actual width of the one or more user text entries of the second horizontal alignment type, and
- if the sum of the actual width of the one or more user text entries of the first horizontal alignment type and the actual width of the one or more user text entries of the second horizontal alignment type exceeds the available text width, wrapping at least one of the user text entries of the first horizontal alignment type and or the user text entries of the second horizontal alignment type.

19. The system of claim 18, the program instructions further implementing steps of:
- repeating the determining step and the wrapping step until the sum of the actual width of the one or more user text entries of the first horizontal alignment type and the actual width of the one or more user text entries of the second horizontal alignment type does not exceed the available text width.

20. The system of claim 18, the wrapping step further comprising:
- determining which of the actual width of the one or more user text entries of the first horizontal alignment type and the actual width of the one or more user text entries of the second horizontal alignment type is greater; and wrapping at least one of the user text entries of the horizontal alignment type corresponding to the one or more text entries of the horizontal alignment type having the greater actual width.

* * * * *